(12) United States Patent
Chen et al.

(10) Patent No.: US 7,810,981 B2
(45) Date of Patent: Oct. 12, 2010

(54) BACKLIGHT

(75) Inventors: Yan Chen, Beijing (CN); Mili Fang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 44 days.

(21) Appl. No.: 12/273,680

(22) Filed: Nov. 19, 2008

(65) Prior Publication Data
US 2009/0196067 A1 Aug. 6, 2009

(30) Foreign Application Priority Data
Feb. 4, 2008 (CN) .................. 2008 1 0057695

(51) Int. Cl.
*F21V 8/00* (2006.01)
(52) U.S. Cl. ............. 362/614; 362/260; 362/613; 362/617; 362/621; 362/630
(58) Field of Classification Search ............. 362/260, 362/611, 613, 614, 621, 617, 619, 632, 634, 362/630
See application file for complete search history.

(56) References Cited

U.S. PATENT DOCUMENTS

| 5,253,089 | A | * | 10/1993 | Imai | ..................... 349/65 |
|---|---|---|---|---|---|
| 5,442,522 | A | * | 8/1995 | Kalmanash | ............... 362/26 |
| 5,450,292 | A | * | 9/1995 | Yokoyama et al. | ......... 362/613 |
| 2003/0223215 | A1 | * | 12/2003 | Shin et al. | ................... 362/27 |
| 2007/0053207 | A1 | * | 3/2007 | Kokogawa | ............... 362/614 |
| 2007/0139964 | A1 | * | 6/2007 | Peng et al. | ............... 362/614 |

FOREIGN PATENT DOCUMENTS

| CN | 1451999 A | 10/2003 |
|---|---|---|
| CN | 1694137 A | 11/2005 |
| CN | 1716035 A | 1/2006 |
| CN | 101089662 A | 12/2007 |
| JP | 05-088166 A | 4/1993 |
| KR | 20050067857 A | 7/2005 |
| KR | 20080007934 A | 1/2008 |

* cited by examiner

*Primary Examiner*—Laura Tso
(74) *Attorney, Agent, or Firm*—Ladas & Parry LLP

(57) ABSTRACT

The present invention relates to a backlight for a liquid crystal display (LCD). The backlight can comprise a back cover including a bottom plate and side covers, a light guide plate disposed on the bottom plate, and cold cathode fluorescence lamps (CCFLs) located on the sides of the light guide plate and enclosed by the side covers. The CCFLs can be disposed on four sides of the light guide plate. The CCFLs can be two lamps in L shape or four lamps in a straight line shape disposed on the sides of the light plate, with high voltage ends of one CCFL adjacent to the low voltage ends of another CCFL, thus allowing the LCD lighter, slimmer and more compact in structure.

12 Claims, 2 Drawing Sheets

BACKLIGHT

FIELD OF THE INVENTION

The present invention relates to a backlight, and in particular, to a backlight with an improved surrounding lamp configuration and a convex type light guide plate for a liquid crystal display (LCD).

BACKGROUND OF THE INVENTION

A liquid crystal display (LCD) module typically comprises a LCD panel, an external driving circuit and a backlight, as shown in FIG. 1. Since LCD module is a passive type light-emitting display, it is necessary to use a backlight to provide a light source for the LCD module. A backlight typically comprises cold cathode fluorescence lamps (CCFLs) 1, a light guide plate (LGP) 2, and optical films 4 including prism film, diffusing film and overcoat, etc. The CCFLs are the light emitting devices popularly employed in a LCD, and are typically disposed on the side of the backlight. A reflective film is disposed on the bottom surface of the backlight to reflect light from the CCFLs back to the light guide plate. The light guide plate is used for directing light upwards. The prism film is used for converging light to improve brightness, the diffusion film is used for diffusing lights to improve uniformity, and the overcoat is used to protect the optical films from damage.

In a conventional LCD, there are provided two CCFLs for one light incident surface of the light guide plate, as shown in FIG. 1. Thus the light guide plate may suffer from localized high temperature near the CCFLs, in which case the light guide plate is susceptible to deformation.

SUMMARY OF THE INVENTION

According to one embodiment of the present invention, there is provided a backlight to improve light efficiency and display uniformity, allowing the liquid crystal display lighter and slimmer, thus reducing the cost and improving the display quality.

According to one embodiment of the present invention, there is provided a backlight for a liquid crystal display (LCD). The backlight can comprise a back cover including a bottom plate and side covers, a light guide plate disposed on the bottom plate, and cold cathode fluorescence lamps (CCFLs) located on the sides of the light guide plate and enclosed by the side covers. The CCFLs can be disposed on four sides of the light guide plate.

In one aspect, the CCFLs can be two lamps in L shape and each lamp in L shape is disposed on two adjacent sides of the light guide plate in such a manner that high voltage ends of the two CCFLs in L shape are disposed diagonally opposing to each other. Alternatively, the CCFLs can be four lamps in a straight line shape and each lamp in a straight line shape is disposed on one sides of the light guide plate in such as manner that high voltage end of one CCFL is disposed adjacent to low voltage end of another CCFL.

In another aspect, light incident surfaces on the four sides of the light guide plate can be regular curve surfaces, and the axes of the CCFLs on the sides can be coaxial with the focal lines of the regular curve surfaces, respectively.

In another aspect, light exiting surface of the light guide plate can be a convex surface, and a radius of curvature of the convex surface and a thickness of the light guide plate satisfy following equations:

$$n/L + n'/L' = 1/f, \text{ and}$$

$$h = af^2 + bf + c$$

wherein h is the thickness of the light guide plate, f is the radius of curvature of the convex surface, L is an object distance of the convex surface, L' is an image distance of the convex surface, and a, b and c are first, second and third parameter, respectively.

In another aspect, a light diffusion pattern can be disposed on the light exiting surface of the light guide plate along edge regions. The inner surfaces of the bottom plate and the side covers of the back cover can be reflective surface with mirror-like polishing.

In another aspect, a groove for accommodating wires and cables in the LCD can be formed at a back surface of the bottom plate of the back cover along a diagonal line connecting the ends of the CCFL.

According to the embodiments of the invention, with the surrounding configuration of the L shape or straight line shape CCFLs, the high voltage ends of the CCFLs are disposed diagonally opposing to each other, and therefore the light incident to the light guide plate from CCFLs can be more uniformly distributed. With the convex shape of the light exiting surface of the light guide plate, the light efficiency as well as the uniformity of the display can be improved. In a conventional LCD in which two CCFL are used for one light incident surface, the light guide plate may suffer from localized high temperature in the vicinity of the light incident surface, thus the light guide plate is susceptible to deformation. The backlight according to the embodiments can avoid the above defects. Furthermore, with the granular material disposed along the edge region of the upper surface of the light guide plate, the bright line near the lamps can be prevented, thus improving the display quality of the LCD. In addition, with the reflective inner surface of the back cover, the backlight according to the embodiments can be employed without a separate reflective cover for the CCFL, thus reducing the cost and allowing the LCD lighter, slimmer and more compact in structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

The present invention will be described in further details by the accompanying drawings and embodiments thereafter.

First Embodiment

Figure 1:
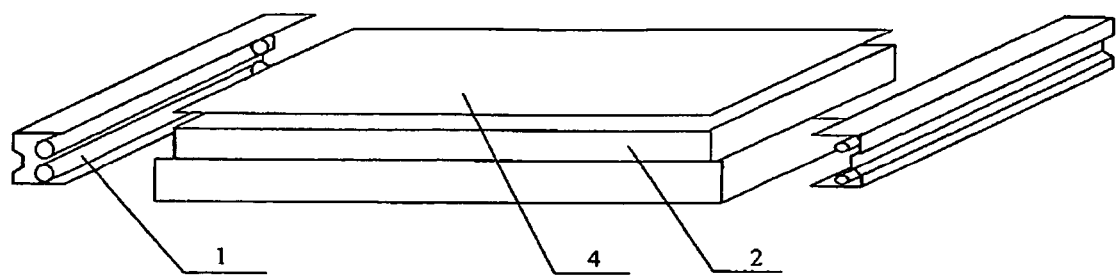
FIG. 1 is a schematic view showing a conventional backlight.
Figure 2:
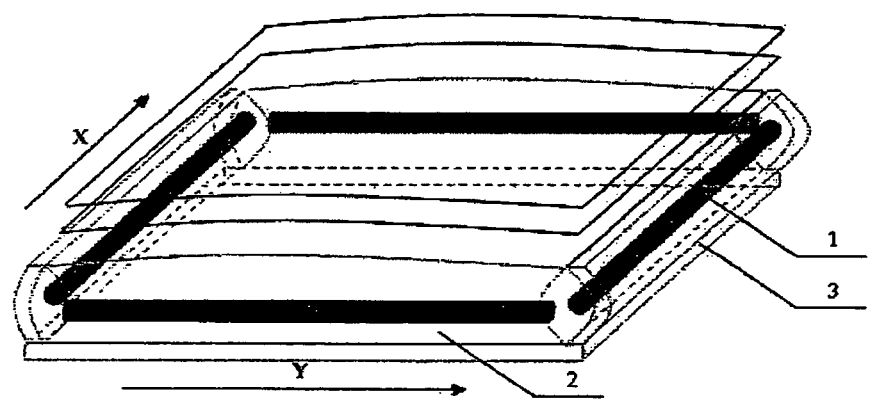
FIG. 2 is a schematic view of a backlight according to a first embodiment of the present invention.

FIG. 2 is a schematic view of a backlight according to the first embodiment of the present invention. As shown in FIG. 2, the backlight comprises a back cover 3 with a bottom plate and side covers, a light guide plate 2 disposed on the bottom plate of the back cover 3, and two cold cathode fluorescence lamps (CCFLs) 1 located on the sides of the light guide plate 2. The CCFLs 1 are lamps in "L" shape. Each CCFL is disposed on two adjacent sides of the light guide plate 2 in such a manner that the high voltage ends of the two CCFLs are disposed diagonally opposing to each other. For example, the two CCFLs in L shape can be disposed as following. The high voltage end of the first CCFL in L shape is disposed at upper left corner while the high voltage end of the second CCFL in L shape is disposed at lower right corner. Alternatively, the high voltage end of the first CFFL in L shape is disposed at lower left corner while the high voltage end of the second CCFL in L shape is disposed at upper right corner. Thus the high voltage end of one CCFL is disposed adjacent to the low voltage end of the other CCFL.

Since the CCFL emits light with the mercury ions inside the high voltage ionization tube, more mercury ions are activated near the high voltage end compared with the low voltage end of the CCFL, and in turn the high voltage end of the CCFL is brighter than the low voltage end of the CCFL. According to the backlight of the present embodiment, the brighter high voltage end of one CCFL is disposed adjacent to the dim low voltage end of the other CCFL, thus mixing the brighter portion and dim portion in the backlight. Therefore, the display uniformity of the LCD can be improved.

Four side surfaces of the light guiding plate are light incident surfaces in a regular curve shape. Each axis of the CCFL is coaxial with the focal line of the regular curve surface of each light incident surface. The light exiting surface of the light guide plate is flat or a convex surface so that the exiting lights can be converged with respect to the center of the light guide plate. The curvature radius of the convex surface and the thickness of the light guide plate satisfy the following equations:

$$n/L + n'/L' = 1/f, \text{ and}$$

$$h = af^2 + bf + c$$

wherein h is the thickness of the light guide plate, f is the radius of curvature of the convex surface, L is the object distance of the convex surface, L' is the image distance of the convex surface, and a, b and c are first, second and third parameters, respectively.

Figure 3:
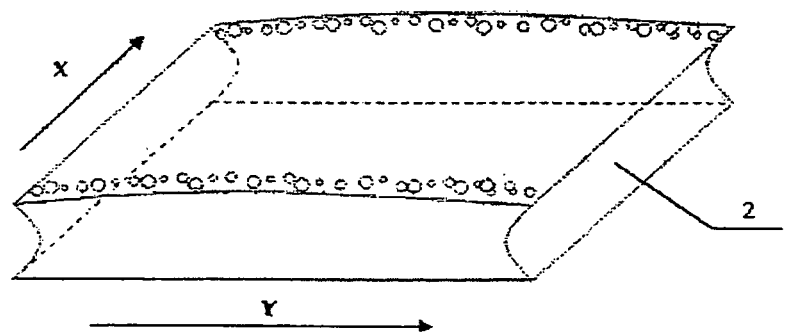
FIG. 3 is a schematic view showing a light guide plate of the backlight according the embodiment of the present invention.

Furthermore, in order to prevent producing bright lines near the lamps, a light diffusing (hazing) pattern is disposed on the upper surface of the light guide plate along the edge region. The light diffusing pattern can be disposed along the four sides of the light guide plate. Alternatively, the light diffusing layer can be disposed along only two long sides of the light guide plate. The diffusing (hazing) pattern can be resulted from granular material on the surface of the light guide plate. The density of the granular material is larger than the density of the light guide plate, as shown in FIG. 3, which is a schematic view of the light guide plate of the backlight according to the present embodiment.

Figure 4:
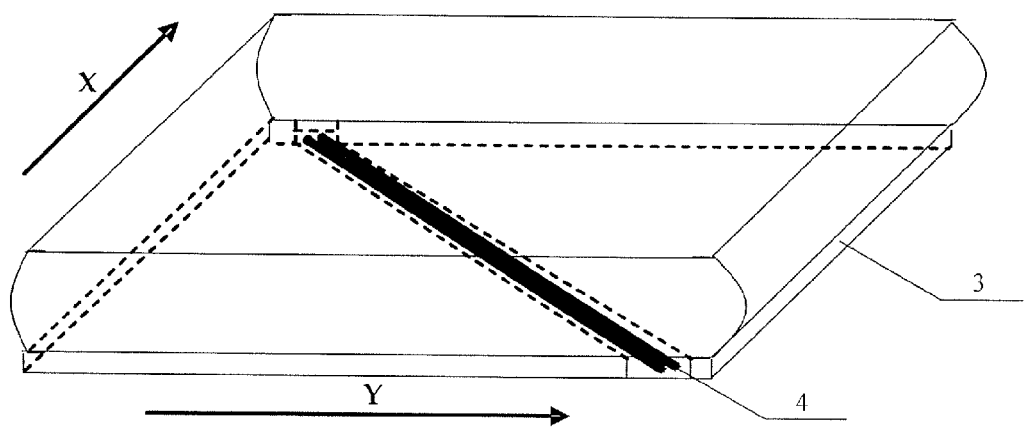
FIG. 4 is a schematic view showing a back cover of the backlight according the embodiment of the present invention.

The back cover 3 can be made of a metal, and the side covers enclose the CCFLs. The CCFLs can be mounted on the bottom plate of the back cover 3. A groove 4 for accommodating wires and cables in the LCD can be provided at the back surface of the bottom plate along a diagonal line connecting the ends of the CCFLs, as shown in FIG. 4, which is a schematic view of the back cover of the backlight according to the present embodiment.

Furthermore, in order to improve the reflectivity of the back cover to a value comparable to the reflective film used in a conventional LCD or of approximately 100%, the inner surfaces of the bottom plate and side covers of the metallic back cover 3 are reflective surface with a mirror-like polishing. Alternatively, a reflective film can be attached to the inner surfaces of the side covers to replace lamp covers in the conventional LCD. Preferably, the distance between the inner surface of side covers with the reflective films and the axis of the CCFL is substantially the same as the distance between the light incident surface of the light guide plate and the axis of the CCFL.

According to the present embodiment of the invention, with the surrounding configuration of the CCFLs in L shape, the high voltage ends of the CCFLs are disposed diagonally opposing to each other, and therefore the light incident to the light guide plate from the CCFLs can be more uniformly distributed. With the convex shape of the light exiting surface of the light guide plate, the light efficiency as well as the uniformity of the display can be further improved. In the conventional LCD in which two CCFLs are used for one light incident surface, the light guide plate may suffer from localized high temperature in the vicinity of the light incident surface, thus the light guide plate is susceptible to deformation. The backlight according to the present embodiment can avoid the above defects. Furthermore, with the granular material disposed along the edge region of the upper surface of the light guide plate, the bright line near the lamps can be prevented, thus improving the display quality of the LCD. In addition, with the reflective inner surface of the back cover, the backlight according to the present embodiment can be employed without a separate reflective cover for the CCFL, thus reducing the cost and allowing the LCD lighter, slimmer and more compact in structure.

Second Embodiment

Figure 5:
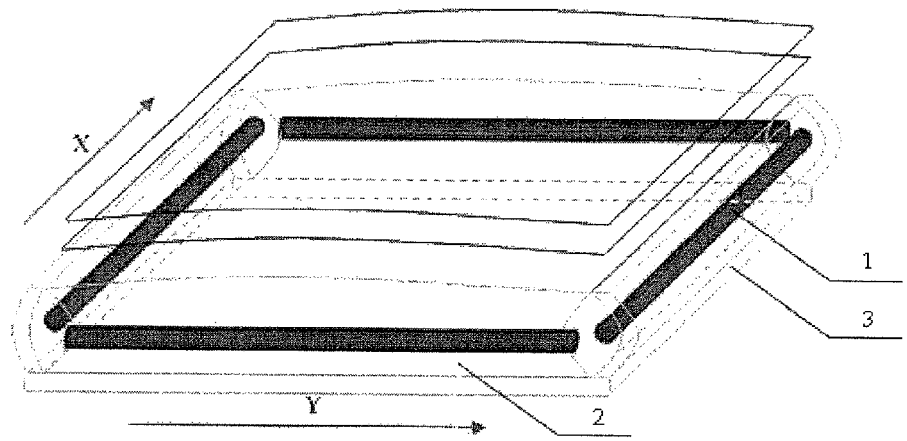
FIG. 5 is a schematic view of a backlight according to a second embodiment of the present invention.

FIG. 5 is a schematic view of a backlight according to the second embodiment of the present invention. As shown in FIG. 5, the backlight comprises a back cover 3 with a bottom plate and side covers, a light guide plate 2 disposed on the bottom plate of the back cover 3, and cold cathode fluorescence lamps (CCFLs) 1 located on the sides of the light guide plate 2. The CCFLs 1 comprise four lamps in a straight line shape. Each CCFL is disposed on one side of the light guide plate 2 in such a manner that the high voltage end of one CCFL is disposed adjacent to the low voltage end of another CCFL.

Since the CCFL emits light with the mercury ions inside the high voltage ionization tube, more mercury ions are activated near the high voltage end compared with the low voltage end of the CCFL, and in turn the high voltage end of the CCFL is brighter than the low voltage end of the CCFL. According to the backlight of the present embodiment, the brighter high voltage end of one CCFL is disposed adjacent to the dim low voltage end of another CCFL, thus mixing the brighter portion and dim portion in the backlight. Therefore, the display uniformity of the LCD can be improved.

Four side surfaces of the light guiding plate are light incident surfaces in a regular curve shape. Each axis of the CCFL is coaxial with the focal line of the regular curve surface of each light incident surface. The light exiting surface of the light guide plate is flat or a convex surface so that the exiting lights can be converged with respect to the center of the light guide plate. The curvature radius of the convex surface and the thickness of the light guide plate satisfy the following equations:

$$n/L+n'/L'=1/f, \text{ and}$$

$$h=af^2+bf+c$$

wherein h is the thickness of the light guide plate, f is the radius of curvature of the convex surface, L is the object distance of the convex surface, L' is the image distance of the convex surface, and a, b and c are first, second and third parameters, respectively.

Furthermore, in order to prevent from producing bright lines near the lamps, a light diffusing (hazing) pattern is disposed on the upper surface of the light guide plate along edge region. The light diffusing pattern can be disposed along the four sides of the light guide plate. Alternatively, the light diffusing layer can be disposed along only two long sides of the light guide plate. The diffusing (hazing) pattern can be resulted from granular material on the surface of the light guide plate. The density of the granular material is larger than the density of the light guide plate, also as shown in FIG. 3, which is a schematic view of the light guide plate of the backlight according to the present embodiment.

The back cover 3 can be made of a metal and the side covers enclosing the CCFLs. The CCFLs can be mounted on the bottom plate of the back cover 3. The groove 4 for accommodating wires and cables in the LCD can be formed at the back surface of the bottom plate along a diagonal line connecting the ends of the CCFLs, also as shown in FIG. 4, which is a schematic view of the back cover of the backlight according to the present embodiment.

Furthermore, in order to improve the reflectivity of the back cover to a value comparable to the reflective film used in the conventional LCD or of approximately 100%, the inner surfaces of the bottom plate and side covers of the metallic back cover 3 are reflective surface with a mirror-like polishing. Alternatively, a reflective film can be attached to the inner surfaces of the side covers to replace lamp covers in a conventional LCD. Preferably, the distance between the inner surface of side covers with the reflective films and the axis of the CCFL is substantially the same as the distance between the light incident surface of the light guide plate and the axis of the CCFL.

According to the present embodiment of the invention, with the surrounding configuration of the CCFLs in a straight line shape, the high voltage ends of the CCFLs are disposed diagonally opposing to each other, and therefore the light incident to the light guide plate from CCFLs can be more uniformly distributed. With the convex shape of the light exiting surface of the light guide plate, the light efficiency as well as the uniformity of the display can be improved. In the conventional LCD in which two CCFL are used for one light incident surface, the light guide plate may suffer from localized high temperature in the vicinity of the light incident surface, thus the light guide plate is susceptible to deformation. The backlight according to the present embodiment can prevent the above defects. Furthermore, with the granular material disposed along the edge region of the upper surface of the light guide plate, the bright line near the lamps can be avoided, thus improving the display quality of the LCD. In addition, with the reflective inner surface of the back cover, the backlight according to the present embodiment can be employed without a separate reflective cover for the CCFL, thus reducing the cost and allowing the LCD lighter, slimmer and more compact in structure.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A backlight for a liquid crystal display (LCD) comprising:
   a back cover including a bottom plate and side covers;
   a light guide plate disposed on the bottom plate; and
   cold cathode fluorescence lamps (CCFLs) located on the sides of the light guide plate and enclosed by the side covers,
   wherein the CCFLs are disposed on four sides of the light guide plate,
   wherein the CCFLs are two lamps in L shape and each lamp in L shape is disposed on two adjacent sides of the light guide plate, and
   wherein high voltage ends of the two CCFLs in L shape are disposed diagonally opposing to each other.

2. The backlight of the claim 1, wherein light incident surfaces on the four sides of the light guide plate are regular curve surfaces, and axes of the CCFLs on the sides are coaxial with focal lines of the regular curve surfaces, respectively.

3. The backlight of the claim 2, wherein a light exiting surface of the light guide plate is a convex surface, and a radius of curvature of the convex surface and a thickness of the light guide plate satisfy following equations:

$$n/L+n'/L'=1/f, \text{ and}$$

$$h=af^2+bf+c$$

wherein h is the thickness of the light guide plate, f is the radius of curvature of the convex surface, L is an object distance of the convex surface, L' is an image distance of the convex surface, and a, b and c are first, second and third parameters, respectively.

4. The backlight of the claim 3, wherein a light diffusion pattern is disposed on the light exiting surface of the light guide plate along edge regions.

5. The backlight of the claim 4, wherein inner surfaces of the bottom plate and the side covers of the back cover are reflective surface with mirror-like polishing.

6. The backlight of the claim 5, wherein a groove is formed at a back surface of the bottom plate of the back cover along a diagonal line connecting the ends of the CCFL.

7. A backlight for a liquid crystal display (LCD) comprising:
   a back cover including a bottom plate and side covers;
   a light guide plate disposed on the bottom plate; and
   cold cathode fluorescence lamps (CCFLs) located on the sides of the light guide plate and enclosed by the side covers,
   wherein the CCFLs are disposed on four sides of the light guide plate, wherein the CCFLs are four lamps in a straight line shape and each lamp in a straight line shape is disposed on one sides of the light guide plate, and a high voltage end of one CCFL with the straight line shape is disposed adjacent to a low voltage end of another CCFL.

8. The backlight of the claim 7, wherein light incident surfaces on the four sides of the light guide plate are regular curve surfaces, and axes of the CCFLs on the sides are coaxial with focal lines of the regular curve surfaces, respectively.

9. The backlight of the claim 8, wherein a light exiting surface of the light guide plate is a convex surface, and a radius of curvature of the convex surface and a thickness of the light guide plate satisfy following equations:

$n/L+n'/L'=1/f$, and $h=af^2+bf+c$ wherein h is the thickness of the light guide plate, f is the radius of curvature of the convex surface, L is an object distance of the convex surface, L' is an image distance of the convex surface, and a, b and c are first, second and third parameters, respectively.

10. The backlight of the claim 9, wherein a light diffusion pattern is disposed on the light exiting surface of the light guide plate along edge regions.

11. The backlight of the claim 10, wherein inner surfaces of the bottom plate and the side covers of the back cover are reflective surfaces with mirror-like polishing.

12. The backlight of the claim 11, wherein a groove is formed at a back surface of the bottom plate of the back cover along a diagonal line connecting the ends of the CCFL.

* * * * *